(12) United States Patent
Takahashi

(10) Patent No.: US 9,964,927 B2
(45) Date of Patent: May 8, 2018

(54) TIMER REMINDER DEVICE AND IN-VEHICLE DEVICE

(71) Applicant: DENSO CORPORATION, Kariya, Aichi-pref (JP)

(72) Inventor: Tomohiro Takahashi, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 14/768,906

(22) PCT Filed: Feb. 4, 2014

(86) PCT No.: PCT/JP2014/000565
§ 371 (c)(1),
(2) Date: Aug. 19, 2015

(87) PCT Pub. No.: WO2014/129128
PCT Pub. Date: Aug. 28, 2014

(65) Prior Publication Data
US 2015/0378315 A1 Dec. 31, 2015

(30) Foreign Application Priority Data
Feb. 20, 2013 (JP) .................................. 2013-031264

(51) Int. Cl.
*G04F 1/00* (2006.01)
*H01M 10/44* (2006.01)
(Continued)

(52) U.S. Cl.
CPC .......... *G04F 1/005* (2013.01); *B60L 11/1816* (2013.01); *B60L 11/1838* (2013.01);
(Continued)

(58) Field of Classification Search
CPC ....... G07C 1/30; G06F 17/3074; G06F 3/165; G06F 3/167; G10L 13/00; G10L 15/26;
(Continued)

(56) References Cited

U.S. PATENT DOCUMENTS 6,868,318 B1 * 3/2005 Cawthorne ........... B60L 11/005
307/10.1
7,388,383 B2 * 6/2008 Kawakami ......... G01R 31/3662
324/430
(Continued)

FOREIGN PATENT DOCUMENTS

DE 3217570 A1 * 11/1983 ............ H02J 7/1415
JP H05308732 A 11/1993
(Continued)

OTHER PUBLICATIONS

"A Simple Guide to Electric Charging" by Eric Shaal, 16 pages, posted in EV Charging on Aug. 3, 2016, and printed in Jun. 2017.*
(Continued)

*Primary Examiner* — Anne M Antonucci
*Assistant Examiner* — Sanjeev Malhotra
(74) *Attorney, Agent, or Firm* — Harness, Dickey & Pierce, P.L.C.

(57) ABSTRACT

A timer reminder device includes an acquiring portion, a determination portion, and a notification portion. When the determination portion determines that a predetermined display condition for displaying a timer setting information is satisfied, the notification portion permits a display portion to display the timer setting information acquired by the acquiring portion. As the display condition, the determination portion determines whether a user is getting off the vehicle. The notification portion permits the display portion to dis-
(Continued)

play the timer setting information for a fixed period when the determination portion determines that the user is getting off the vehicle.

9 Claims, 8 Drawing Sheets

(51) Int. Cl.
*B60L 11/18* (2006.01)
*G01C 21/36* (2006.01)

(52) U.S. Cl.
CPC ...... *B60L 11/1861* (2013.01); *G01C 21/3682* (2013.01); *H01M 10/44* (2013.01); *B60L 2240/80* (2013.01); *B60L 2250/16* (2013.01); *H01M 2220/20* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC ......... G10L 21/00; G10L 21/06; G10L 25/48; H02J 7/00; H04L 12/40032; H04L 12/4013; H04L 12/40136; H04L 12/40156; H04L 12/40163; H04L 12/403; H04L 12/4035; H04L 12/413; H04L 12/417; H04L 2011/0093; H04L 2001/125; H04L 1/0003; H04L 1/0005; H04L 1/0006; H04L 1/0009; H04L 1/0025; H04L 1/0061; H04L 1/0072; H04L 1/08; H04L 1/18; H04L 1/1809; H04L 1/1848; H04L 1/1877; H04L 1/1883; H04L 1/1887; H04L 1/20; Y02T 10/7005; Y02T 90/14; Y02T 10/705; Y02T 10/7072; Y02T 10/7044; Y02T 10/7291; Y02T 90/16; Y02T 10/7077; Y02T 90/121; Y02T 10/70; Y02T 10/7022; Y02T 90/128; H04M 11/00; H04M 11/06; H04M 1/05; H04M 1/2471; H04M 1/6066; H04M 1/72558; H04R 1/1016; H04R 3/00; H04W 4/008; G08B 13/1427; G08B 21/0222; G08B 21/0277; G08B 21/24; G08B 25/10; G08B 1/096827; G08B 1/14; Y02B 60/31; G01R 31/3662; B60L 2240/80; B60L 11/14; B60L 11/005; B60L 11/18; B60L 11/1824; B60L 11/1851; B60L 15/20; B60L 2240/445; B60L 2240/545; B60L 2240/547; B60L 2240/549; B60L 2240/662; B60L 2240/70; B60L 2250/10; B60L 2260/58; B60L 3/12; B60R 16/03; B60W 10/08; B60W 20/00; F02D 41/042
USPC ...... 701/120, 410, 533, 2, 22, 31.4, 45, 102; 704/235, 275; 725/61; 340/407.1, 529, 340/539.11, 687, 932.2; 370/252, 509; 320/107, 104, 109, 134, 153, 162; 137/223; 367/197; 455/556.1; 446/57; 429/90; 702/89; 324/430; 166/369; 123/90.15
See application file for complete search history.

(56) References Cited

U.S. PATENT DOCUMENTS

| | | | |
|---|---|---|---|
| 7,628,671 B2* | 12/2009 | Choi | A63H 27/02 124/26 |
| 7,878,250 B2* | 2/2011 | Sheldon | E21B 47/0007 166/369 |
| 2002/0060551 A1* | 5/2002 | Ikeda | B60L 11/1851 320/104 |
| 2003/0206559 A1* | 11/2003 | Trachewsky | H04L 1/0003 370/509 |
| 2004/0075581 A1* | 4/2004 | Staniszewski | G08G 1/14 340/932.2 |
| 2004/0090206 A1* | 5/2004 | Choi | A63H 18/12 320/107 |
| 2006/0069500 A1* | 3/2006 | Hashizume | G08G 1/096827 701/410 |
| 2006/0122799 A1* | 6/2006 | Chen | G06F 1/14 702/89 |
| 2006/0139182 A1* | 6/2006 | Staniszewski | G08G 1/14 340/932.2 |
| 2007/0145950 A1* | 6/2007 | Wang | H02J 1/14 320/134 |
| 2007/0234985 A1* | 10/2007 | Kolmanovsky | F01L 9/04 123/90.15 |
| 2009/0046593 A1* | 2/2009 | Ptasinski | H04L 1/0003 370/252 |
| 2009/0118997 A1* | 5/2009 | Truitt | G08G 5/0026 701/120 |
| 2009/0248292 A1* | 10/2009 | Adachi | G01C 21/26 701/533 |
| 2010/0030431 A1* | 2/2010 | Potter | B60R 16/03 701/45 |
| 2010/0097036 A1* | 4/2010 | Wakayama | B60L 11/1861 320/153 |
| 2010/0148941 A1* | 6/2010 | Haeselin | A44B 15/005 340/407.1 |
| 2011/0050447 A1* | 3/2011 | Tedesco | G08B 13/1427 340/687 |
| 2011/0128007 A1 | 6/2011 | Nishidai et al. | |
| 2011/0199047 A1* | 8/2011 | Fujii | B60L 1/04 320/109 |
| 2011/0258668 A1* | 10/2011 | Musa | H04N 7/17318 725/61 |
| 2012/0121952 A1* | 5/2012 | Majima | G01R 31/3679 429/90 |
| 2012/0206099 A1 | 8/2012 | Ichikawa et al. | |
| 2013/0289821 A1* | 10/2013 | Nakagawa | B60L 11/1861 701/31.4 |
| 2013/0297176 A1* | 11/2013 | Howell | F02D 28/00 701/102 |
| 2013/0345903 A1* | 12/2013 | Nakagawa | G07C 5/008 701/2 |
| 2014/0031082 A1* | 1/2014 | Zishaan | G08B 21/12 455/556.1 |
| 2014/0111331 A1* | 4/2014 | Tedesco | G08B 13/1427 340/529 |
| 2014/0122073 A1* | 5/2014 | Goldstein | H04M 1/05 704/235 |
| 2014/0166122 A1* | 6/2014 | Goldstein | H04R 1/1041 137/223 |
| 2014/0350943 A1* | 11/2014 | Goldstein | H04M 1/05 704/275 |
| 2015/0151646 A1* | 6/2015 | Noiri | G05D 1/0225 701/22 |
| 2015/0166041 A1* | 6/2015 | Nagata | B60W 20/00 701/22 |
| 2015/0217645 A1* | 8/2015 | Imamura | B60L 1/08 701/22 |
| 2015/0243163 A1* | 8/2015 | Shoemake | G08C 23/02 367/197 |
| 2015/0258908 A1* | 9/2015 | Fukui | B60L 3/00 320/162 |
| 2015/0294554 A1* | 10/2015 | Park | G08B 21/18 340/539.11 |

FOREIGN PATENT DOCUMENTS

| | | |
|---|---|---|
| JP | 2001117508 A | 4/2001 |
| JP | 2009089474 A | 4/2009 |
| JP | 2009113674 A | 5/2009 |
| JP | 2010142026 A | 6/2010 |

(56) References Cited

FOREIGN PATENT DOCUMENTS

| | | |
|---|---|---|
| JP | 2011072088 A | 4/2011 |
| JP | 2011112617 A | 6/2011 |
| JP | 2012110122 A | 6/2012 |

OTHER PUBLICATIONS

"Electric-Car Makers' Quest: One Plug to Charge Them All", 5 pages, appeared in NY Times on Aug. 26, 2011, and printed in Jun. 2017.*
International Search Report and Written Opinion (in Japanese with English Translation) for PCT/JP2014/000565, dated Mar. 11, 2014; ISA/JP.

* cited by examiner

TIMER REMINDER DEVICE AND IN-VEHICLE DEVICE

CROSS REFERENCE TO RELATED APPLICATIONS

This application is a U.S. National Phase Application under 35 U.S.C. 371 of International Application No. PCT/JP2014/000565 filed on Feb. 4, 2014 and published in Japanese as WO 2014/129128 A1 on Aug. 28, 2014. This application is based on and claims the benefit of priority from Japanese Patent Application No. 2013-031264 filed on Feb. 20, 2013. The entire disclosures of all of the above applications are incorporated herein by reference.

TECHNICAL FIELD

The present disclosure relates to a timer reminder device relating to a timer setting for charging a rechargeable battery of a vehicle, and an in-vehicle device having the timer reminder device.

BACKGROUND ART

Some of vehicles driven by electric power, such as electric vehicles and plug-in hybrid vehicles, have a timer function that permits to charge a rechargeable battery in a predetermined specific time zone (patent literature 1).

Such vehicles have an advantage that the rechargeable battery is automatically charged in the time zone set by the timer, such as in a rate-night time zone in which an electric power rate is low or in a time zone other than time zones where electric power is highly used, even if the rechargeable battery is connected to an external power source in time zones other than such time zones set by the timer.

PRIOR ART LITERATURE

Patent Literature

Patent Literature 1: JP 2009-89474 A

SUMMARY OF INVENTION

However, there is a possibility where a rechargeable battery needs to be charged in a time zone outside of the time zone set by the timer, for example, when a user goes out by such a vehicle in the time zone where the electric power is largely used, such as in a daytime.

In such a situation, if the user forgets that the timer has been set and connects the external power source to the chargeable battery for the charging, there is a case where the rechargeable battery is not charged against the user's intention.

It is an object of the present disclosure to provide a timer reminder device that is capable of reminding a user of a timer having been set so that a rechargeable battery of a vehicle is properly charged.

According to an aspect of the present disclosure, a timer reminder device includes an acquiring portion, a determination portion, and a notifying portion. The acquiring portion acquires a timer setting information from a managing portion that manages the timer setting information set for charging a rechargeable battery of a vehicle. The determination portion determines whether a predetermined display condition set for displaying the timer setting information is satisfied. The notifying portion permits a display portion, which can display the timer setting information, to display the timer setting information acquired by the acquiring portion, when the determination portion determines that the display condition is satisfied.

In such a configuration, even if the user forgets that the timer has been set, the timer setting information is displayed by the display portion when the display condition is satisfied. Therefore, it is possible to remind the user of the timer having been set.

Therefore, when this timer reminder device is used, the user hardly forgets the timer having been set. As such, it is less likely that the rechargeable battery will not be charged against the user's intention. That is, since the timer reminder device can remind the user of the timer having been set, the rechargeable battery of the vehicle can be properly charged according to the user's intention.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
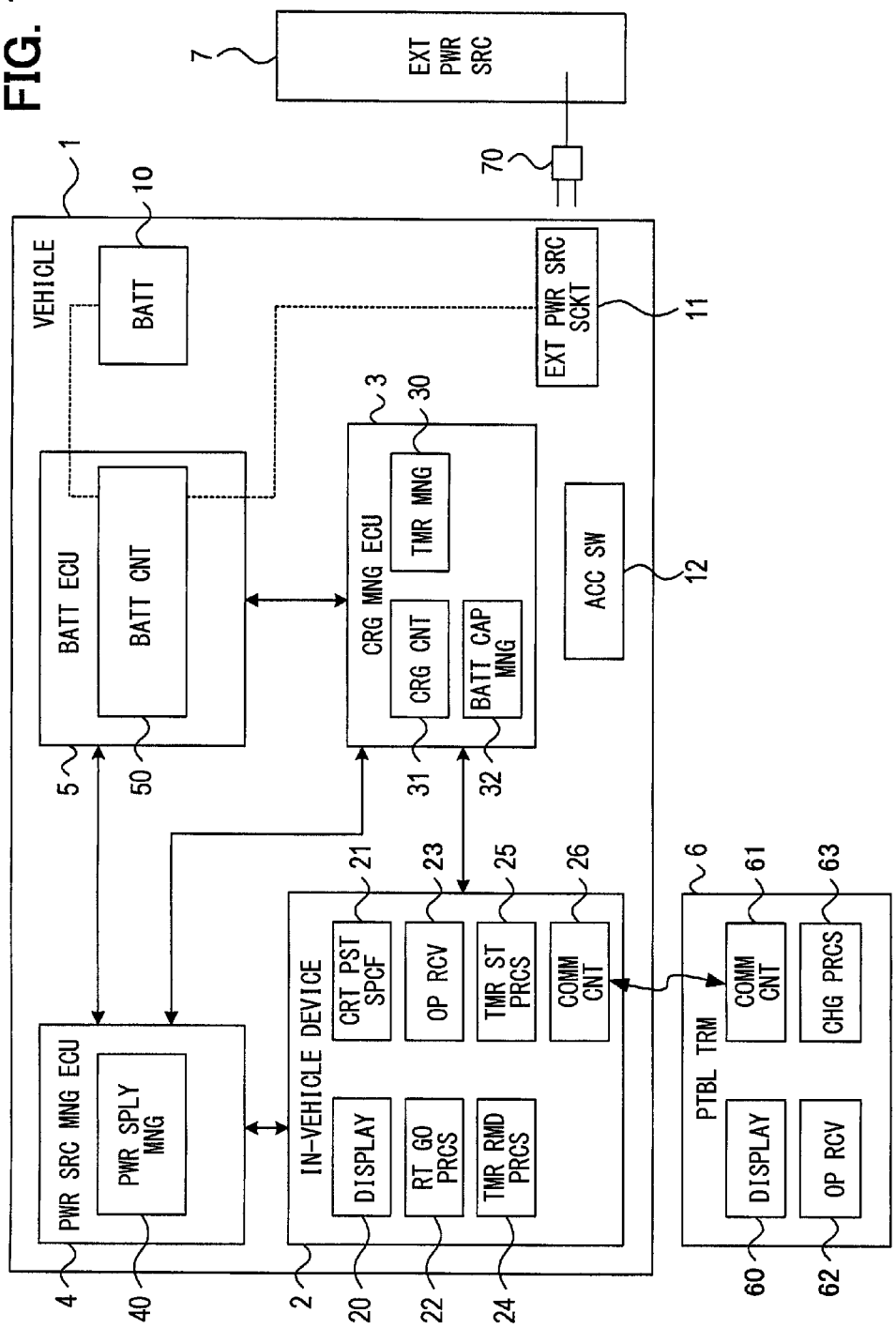
FIG. 1 is a block diagram of a vehicle and peripheral devices according to a first embodiment.

Hereinafter, embodiments of the present disclosure will be described with reference to the drawings.

First Embodiment

A first embodiment (hereinafter referred to as "the present embodiment" in the description of the first embodiment) will be described.

A vehicle 1 includes an in-vehicle device 2, a charge managing ECU 3, a power source managing ECU 4, and a battery ECU 5. The vehicle 1 further includes a battery 10, an external power source socket 11, and an accessory switch 12. The in-vehicle device 2 includes a timer reminder device. The battery 10 corresponds to an example of a rechargeable battery.

The vehicle 1 is an electric vehicle or a hybrid vehicle. When a key for the vehicle is inserted into a keyhole of the vehicle 1 and rotated, the accessory switch 12 is turned on and electric power is supplied to respective parts of the vehicle 1 including the in-vehicle device 2 described above to make the respective parts in operable states. When the key is returned to the position into which the key has been inserted, the accessory switch 12 is turned off, and the electric power is not supplied to the respective parts in general.

When the vehicle key is further rotated from the position at which the accessory switch 12 is turned on, the vehicle 1 is in a state where the vehicle 1 can travel by driving a non-illustrated motor with electric power stored in the battery 10.

In the vehicle 1, the in-vehicle device 2, the charge managing ECU 3, the power source managing ECU 4, and the battery ECU 5 are mutually, communicably connected to each other.

In the vehicle 1, when a plug 70 of the external power source 7 is connected to the external power source socket 11, electric power is supplied from the external power source 7 to the battery 10 under the control of the battery ECU 5 so that the battery 10 is charged.

In the vehicle 1, the in-vehicle device 2 is wirelessly communicable with the portable terminal 6.

Hereinafter, respective devices 2 to 5 integrated to the vehicle 1 and an internal structure of the portable terminal 6 will be described in detail. Each of the devices exemplified as a device constituting a functional block described hereinafter is not necessarily used in each functional block, but may be used by another functional block as necessary.

The in-vehicle device 2 includes a computer device and respective devices. The in-vehicle device 2 includes, as respective functional blocks, a display portion 20, a current position specifying portion 21, a route guide processing portion 22, an operation receiving portion 23, a timer reminder processing portion 24, a timer setting processing portion 25, a wireless communication control portion 26 and a power source switch.

The display portion 20 is a functional block that displays various images necessary when executing various processing performed in the in-vehicle device 2. The display portion 20 includes a liquid crystal display and the like for displaying such images. The display portion corresponds to a display device. The display portion will also be referred to as an in-vehicle display portion.

The current position specifying portion 21 is a functional block that specifies a current position of the vehicle 1. The current position specifying portion 21 includes a GPS receiver, a gyroscope and the like.

The route guide processing portion 22 is a functional block that permits the display portion 20 to display a route guide image for a route guide to thereby guide a route. The route guide processing portion 22 includes a map storage device in which map information is stored.

Figure 3:
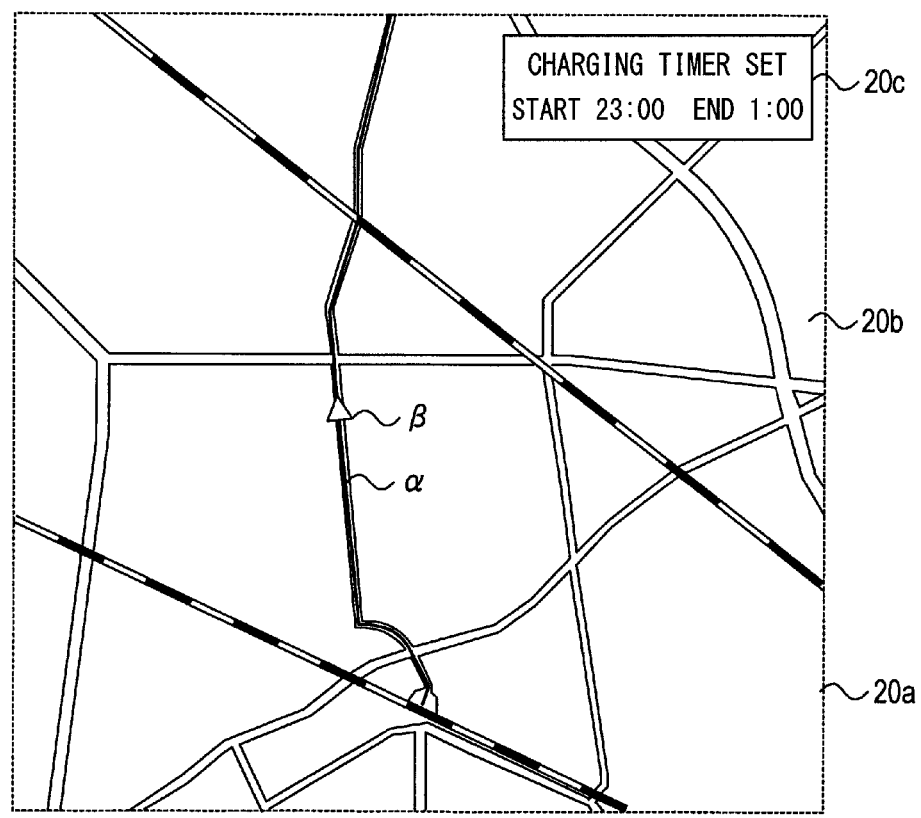
FIG. 3 is a diagram illustrating an image in which a timer setting information is displayed on a map according to the first embodiment.

For example, as shown in FIG. 3, a route guide image 20b is an image in which a symbol α indicating the current position of the vehicle specified by the current position specifying portion 21 and a symbol β indicating a guiding route specified by a known method are displayed on a map indicating a periphery of the current position of the vehicle 1 stored in the map storage device.

The map storage device may be any storage device such as CD-ROM, HDD, or a nonvolatile rewritable memory.

As shown in FIG. 1, the operation receiving portion 23 is a functional block that receives a user's operation, and provides various instructions corresponding to the operation received to various functional portions of the in-vehicle device 2 or various devices of the vehicle 1.

The operation receiving portion 23 includes human interfaces such as various switches provided in a housing of the in-vehicle device 2 or a transparent touch panel layered on the liquid crystal display of the display portion 20.

The timer reminder processing portion 24 is a functional block that executes a timer reminding processing, which will be described later.

The timer setting processing 25 is a functional block that executes a processing of specifying a time zone (hereinafter referred to as the "charging time zone") for charging the battery 10 with the electric power from the external power source 7 and a processing of specifying whether the charging is performed in the charging time zone, relative to a timer managing portion 30 of the charge managing ECU 3.

The charging time zone is specified when a user operates the operation receiving portion 23 according to an image for specifying the time zone displayed on the display portion 20. Information regarding the charging time zone specified (hereinafter referred to as the "charging time zone information") is stored in the timer managing portion 30 of the charge managing ECU 3.

In Japan, examples of the charging time zone are generally a late-night time zone (e.g., 23:00 to 2:00 of next day) in which the electric power rate is low and a time zone other than the time zone in which a large amount of electric power is used. However, the charging time zone is not limited to these examples.

An image for specifying execution of the charging in the charging time zone is displayed by the display portion 20. The execution of the charging in the charging time zone is specified when the user operates the operation receiving portion 23 according to the image displayed by the display portion 20. Information specified (hereinafter referred to as the "timer execution information") is stored in the timer managing portion 30.

The wireless communication control portion 26 is a functional block that permits the wireless communication of the in-vehicle device 2 with the portable terminal 6. The wireless communication control portion 26 includes various devices necessary for the wireless communication. The communication standard is not particularly limited, but may be any standard such as Bluetooth (registered trademark) or Wi-Fi (registered trademark). The communication may be conducted through a public communication channel of mobile phones.

The in-vehicle device 2 includes a ROM forming the computer device. The in-vehicle device 2 executes processing for realizing the respective functions of the functional blocks 20 to 26 described above, based on various programs stored in the ROM.

Next, the charge managing ECU 3 will be described.

The charge managing ECU 3 is made of a nonvolatile rewritable memory that stores various information, which will be described later, in addition to CPU, ROM, RAM and the like, which form the computer.

The charge managing ECU 3 includes, as functional blocks, the timer managing portion 30, a charge control portion 31, and a battery charged amount managing portion 32.

The timer managing portion 30 is a functional block that manages the charging time zone information specified by the timer setting processing portion 25 and the timer execution information, which are described above.

A situation where the timer execution information indicates to execute the charging based on the charging time zone information is hereinafter referred to as that the timer has been set. A situation where the timer execution information indicates acceptance of the charging irrespective of the charging time zone information is hereinafter referred to as that the timer setting has been released.

The information relating to the timer setting described above, such as the charging time zone information and the timer execution information, is referred to as the timer setting information.

The charge control portion 31 is a functional block that controls the charging of the battery 10 by the battery ECU 5. The charge control portion 31 executes the control of instructing permission or prohibition of the charging to the battery ECU 5, based on the timer setting information managed by the timer managing portion 30.

The battery charged amount managing portion 32 is a functional block that manages the information regarding the charged amount of the battery 10. The information regarding the charged amount of the battery 10 may be collected using a conventional method. Alternatively, when the battery ECU 5 has a functional block that detects the charged amount of the battery 10, the information regarding the charged amount of the battery 10 may be obtained from the functional block.

Next, the power source managing ECU 4 will be described.

The power source managing ECU 4 is made of a power supply switch and a power supply adjustment component (e.g., adjusting resistor), in addition to the CPU, ROM and RAM, which form the computer.

The power supply switch and the power supply adjustment component are disposed on power supply lines that supply electric power from the battery 10 to the various devices of the vehicle 1, such as the in-vehicle device 2, the charge managing ECU 3, and the battery ECU 5.

The power source managing ECU 4 includes, as a functional block, a power source supply managing portion 40. The power source supply managing portion 40 performs communication with the in-vehicle device 2, the charge managing ECU 3, and the battery ECU 5. The power source supply managing portion 40 turns on and off the power supply switch and adjusts the power supply adjusting component, to execute a processing of adjusting the amount of electric power supplied to each of the devices 2, 3 and 5.

Next, the battery ECU 5 will be described.

The battery ECU 5 includes a non-illustrated charging switch and, as a functional block, a battery control portion 50, in addition to the CPU, ROM and RAM, which form the computer.

The charging switch is disposed on a power supply line that supplies electric power from the external power source socket 11 to the battery 10.

The battery control portion 50 executes a processing of supplying the electric power from the external power source 7 to the battery 10 by turning on and off the charging switch according to the instruction from the charging control portion 31.

Next, the portable terminal 6 will be described.

The portable terminal 6 includes the computer device and various devices. The portable terminal 6 is a wireless communication device and includes, as functions, a display portion 60, a wireless communication control portion 61, an operation receiving portion 62 and a change processing portion 63.

The display portion 60 executes a processing of displaying various images to be displayed in the various processing performed in the portable terminal 6. The display portion 60 includes a liquid crystal display for displaying these images and a control unit for controlling the liquid crystal display.

That is, the display portion 60 corresponds to the display device. The display portion 60 will also be referred to as a portable display portion.

The wireless communication control portion 61 is a functional block to permit the wireless communication of the portable terminal 6 with the in-vehicle device 2. The wireless communication control portion 61 includes various devices necessary for the wireless communication. The wireless communication control portion 61 has a similar structure to the wireless communication control portion 26.

The operation receiving portion 62 is provided by a plurality of switches and the like for operating the portable terminal 6 and formed on a housing of the portable terminal 6.

The change processing portion 63 includes a vibrator or a sound producing device. The change processing portion 63 is a functional block to execute a timer reminder auxiliary processing, which will be described later.

Next, a case where the battery 10 of the vehicle 1 is charged with the electric power supplied from the external power source 7.

In this case, the plug 70 extending from the external power source 7 is first connected to the external power source socket 11 of the vehicle 1.

Thus, when the timer setting has been released, the battery 10 is charged with the electric power from the external power source 7 immediately after the plug 70 is connected to the external power source socket 11.

In contrast, when the timer has been set, the charging of the battery 10 is not immediately started. The charging of the battery 10 with the electric power of the external power source 7 is started when the charging start time indicated by the charging time zone information managed by the timer managing portion 30 arrives.

Therefore, when the charging is necessary in the state where the timer has been set, it is necessary to release the timer setting.

In fact, a user may forget that the timer has been set.

Figure 2:
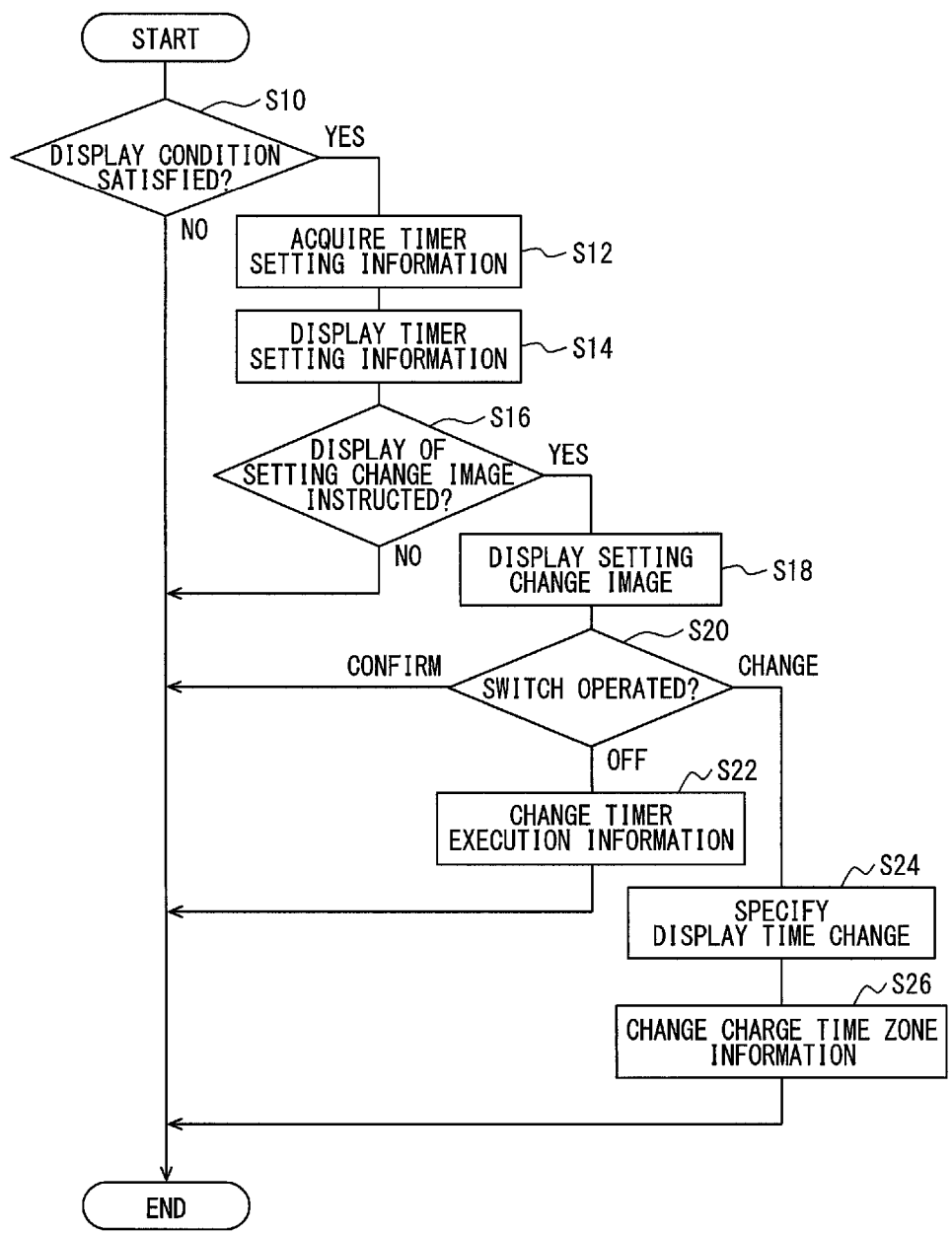
FIG. 2 is a flowchart of a timer reminder processing performed by the first embodiment.

Hereinafter, a timer reminder processing performed in such a case by the timer reminder processing portion 24 for reminding the user of the timer having been set will be described with reference to a flowchart of FIG. 2.

In the timer reminder processing described hereinafter, it is performed when the timer has been set.

The timer reminder processing is repeatedly executed in a period from the time the accessory switch 12 of the vehicle is turned on to the time the accessory switch 12 is turned off. That is, the timer reminder processing is repeatedly executed in the period where the vehicle is traveling.

Note that the period where the vehicle is traveling includes a period where the vehicle is at a halt.

When the timer reminder processing begins, a process of S1 is executed first.

At S10, the process of determining whether a predetermined display condition for displaying the timer setting information is satisfied or not is executed.

As the display condition, various conditions may be considered.

Examples of the display condition are: 1) a case where a user operates the operation receiving portion 23 and specifies a destination for determining a guide route for the route guide processing executed by the route guide processing portion 22; and 2) a case where the user specifies the own house as the destination of the guide route.

Further, the examples of the display condition include 3) a case where the charge level of the battery 10 is reduced lower than a predetermined charge level during the traveling.

Furthermore, the examples of the display condition include: 4) a case where the current position specified by the current position specifying portion 21 is at the own house or in the periphery of the destination of the guide route (in a predetermined fixed area from the destination: for example, in an area of 500 m from the destination); and 5) a case where the current position specified by the current position specifying portion 21 is close to a charging station (in a predetermined fixed area from the charging station: for example, in an area of 500 m from the destination). Note that, as the location of the charging station, a location included in the map information of the route guide processing portion 22 is preferably used.

The display conditions are not limited to the above-described conditions 1) to 5). The display condition may be simply "DURING TRAVELING", for example. A plurality of display conditions may be set. Further, the display condition may be arbitrary changed.

When the display condition is satisfied at S10 (S10: YES), a process of acquiring the timer setting information from the timer managing portion 30 is executed (S12). Also, a process of displaying the acquired timer setting information by the display portion 20 is executed (S14), and then a process of S16 is executed.

FIG. 3 is an example of an image 20a displayed when S14 is executed.

The image 20a includes, for executing the route guide processing, the route guide image 20b in which the symbols indicating the guide route a and the current position β of the vehicle are indicated on the map, and a timer image 20c based on the timer setting information.

The route guide image 20b is displayed in the entirety of a screen, and the timer image 20c is displayed at a left upper corner on the route guide image 20b.

The timer image 20c of the present embodiment includes letters of "CHARGING TIMER SET" at an upper row and letters indicating the charging start time (23:00 in the present embodiment) and the charging end time (1:00 on the next day in the present embodiment) at a lower row, such as "START 23:00" and "END 1:00".

When the display condition is not satisfied at S10 (S10: NO), the timer reminder processing is immediately ended.

At S16, a process of determining whether an operation for instructing the display of the setting change image for changing the timer set information is made to the operation receiving portion 23 is executed.

When the operation for instructing the display of the setting change image is not made (S16: NO), the timer reminder processing is ended.

When the operation for instructing the display of the setting change image is made (S16: YES), processes of S18 to S26 are executed.

At S18, a process of displaying the setting change image is executed.

Figure 4A:
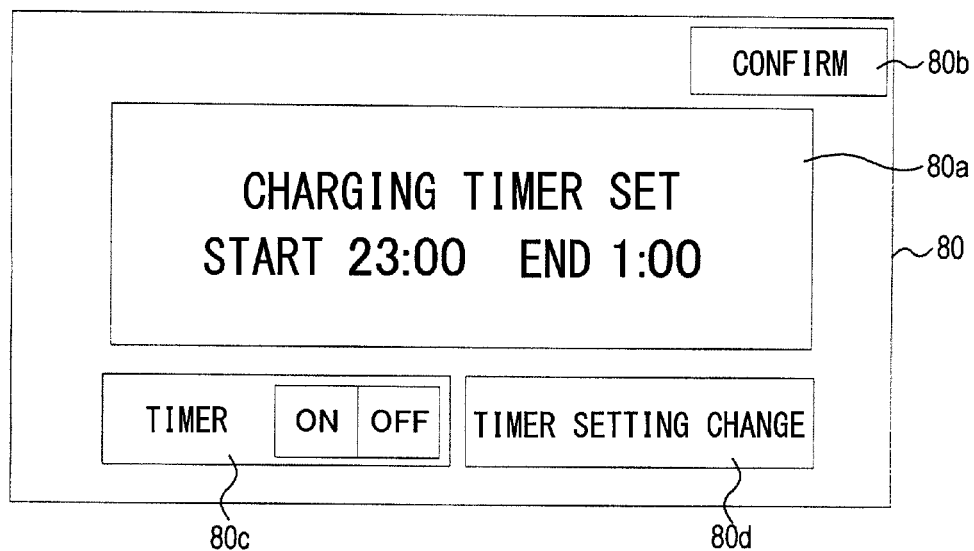
FIG. 4A is a diagram illustrating a setting change image displayed when the timer setting information is to be changed according to the first embodiment.

In this case, as the setting change image 80, an image as shown in FIG. 4A is displayed.

The setting change image 80 includes a charging time zone image 80a, a confirmation image 80b, a timer execution image 80c and a timer setting change image 80d.

The charging time zone image 80a is for displaying information regarding charging time zone information. The charging time zone image 80a is displayed at a center of the setting change image 80. The charging time zone image 80a includes display of "CHARGING TIMER SET" at an upper row and display of "START 23:00, END 1:00" at a lower row.

The confirmation image 80b is displayed at an upper right corner of the setting change image 80. The confirmation image 80b includes display of "CONFIRM" at a center thereof.

The timer execution image 80c is for displaying information regarding the timer execution information. The timer execution image 80c is displayed at left lower position of the charging time zone image 80a. The timer execution image 80c includes display of "timer" on a left side and displays of "ON" and "OFF" on a right side. The display of "OFF" is on a right side of the display of "ON". In the present embodiment, since the timer has been set, the portion where "ON" is displayed is shown brighter than the portion where "OFF" is displayed.

The timer setting change image 80d includes display of "timer setting change" at a center thereof.

When the user touches a portion of the touch panel where the confirmation image 80b, the timer execution image 80c or the timer setting changing image 80d is displayed, the operation receiving portion 23 regards as a switch operation corresponding to the image touched is made.

At S20, a process of determining which switch operation has been made among these switch operations.

When the touch panel of the portion where the confirmation image 80b is displayed is operated (S20: CONFIRM), the timer reminder processing is ended.

Of the portion where the timer execution image 80c is displayed, the touch panel of the portion where the display of OFF is made at a center of the rectangle is operated (S20: OFF), a process of S22 is executed next.

At S22, an instruction to change the timer execution information to the information indicating that the timer setting has been released is made to the timer managing portion 30. Thus, the timer execution information managed in the timer managing portion 30 is rewritten.

When S22 is finished, the timer reminder processing is ended.

When the touch panel of the portion where the timer setting change image 80d is displayed is operated (S20: CHANGE), a process of S24 is executed next.

Figure 4B:
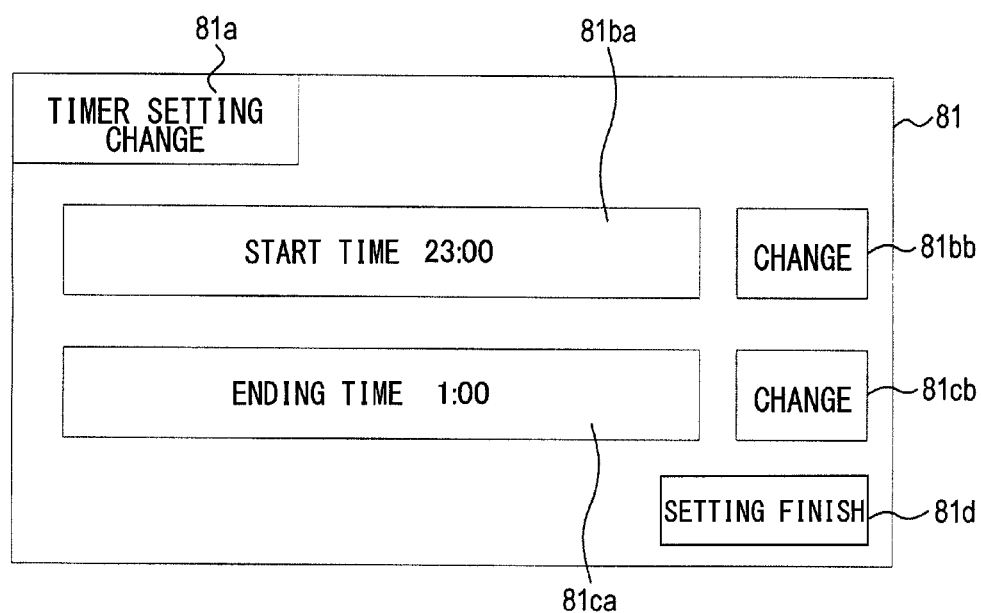
FIG. 4B is a diagram illustrating a charging time zone change image displayed when the timer setting information is to be changed according to the first embodiment.

At S24, the charging time zone change image 81 as shown in FIG. 4B is displayed, and a process of changing the time displayed in the image 81 is executed.

The charging time zone change image 81 includes a title image 81a, a start time image 81ba, a first instruction image 81bb, an end time image 81ca, a second instruction image 81cb, and a setting finish image 81d.

The title image 81a is displayed at a left upper corner of the charging time zone change image 81. The title image 81a includes display of "TIMER SETTING CHANGE" at the center thereof.

The start time image 81ba is displayed under the title image 81a. The start time image 81ba displays a charging start time to start the charging based on the charging time zone information.

The first instruction image 81bb is for instructing the change of the start time. The first instruction image 81bb is displayed on the right side of the start time image 81ba. The first instruction image 81bb includes display of "CHANGE".

The end time image 81ca is displayed under the start time image 81ba. The end time image 81ca indicates a charging end time to end the charging based on the charging time zone information.

The second instruction image 81cb is for instructing the change of the end time. The second instruction image 81cb is displayed on the right side of the end time image 81ca. The second instruction image 81cb includes display of "CHANGE".

The setting finish image 81d is displayed under the second instruction image 81cb. The setting finish image 81d includes display of "SETTING FINISH".

When the user touches the touch panel on the portion where the first instruction image 81bb or the second instruction image 81cb is displayed, it is available to change the charging start time or the charging end time. When the user changes the respective time to a user' intended time for the charging by operating the operation receiving portion 23, the information regarding the time changed is displayed on the start time image 81ba or the end time image 81ca.

When the change of the charging start time and the charging end time is finished and the user touches the touch panel on the screen corresponding to the position of the setting finish image 81d, a process of S26 is executed next.

At S26, the process of transmitting the charging time zone information changed at S24 to the timer managing portion 30 is performed. Thus, the charging time zone information managed in the timer managing portion 30 is rewritten.

When S26 is finished, the timer reminder processing is ended.

In the present embodiment described hereinabove, the following advantageous effects will be achieved.

In the time reminder processing executed by the in-vehicle device 2 of the present embodiment, when it is determined that the predetermined display condition for displaying the timer setting information is satisfied at S10 (S10: YES), the timer setting information is displayed on the display portion 20 at S14.

The display conditions include a time point that is predicted suitable to remind the user that the timer having been set, or the like.

Therefore, when the user tries to connect the external power source 7 to the battery 10, it is less likely that the user will forget the timer having been set.

Therefore, in use of the in-vehicle device 2 of the present embodiment, when the external power source 7 is connected to the battery 10, it is less likely that the charging of the battery 10 will not be performed against the intention of the user.

In the use of the in-vehicle device 2 of the present embodiment, when the timer setting information is displayed to remind the user, the user can easily change of the charging time zone information or release the timer setting by operating the operation receiving portion 62.

In the present embodiment, since the timer setting information is displayed on the display portion 20 of the in-vehicle device 2, which is likely to be viewed while travelling on the vehicle 1. Therefore, the indication of the timer setting information is surely made to the user, and thus the user hardly forget the timer having been set.

Second Embodiment

Next, a second embodiment (hereinafter referred to as "the present embodiment" in the description of the second embodiment) will be described. In the present embodiment, only portions different from those of the first embodiment will be described. The processes and the structures same as those of the first embodiment will be designated with the same reference numbers.

Figure 5:
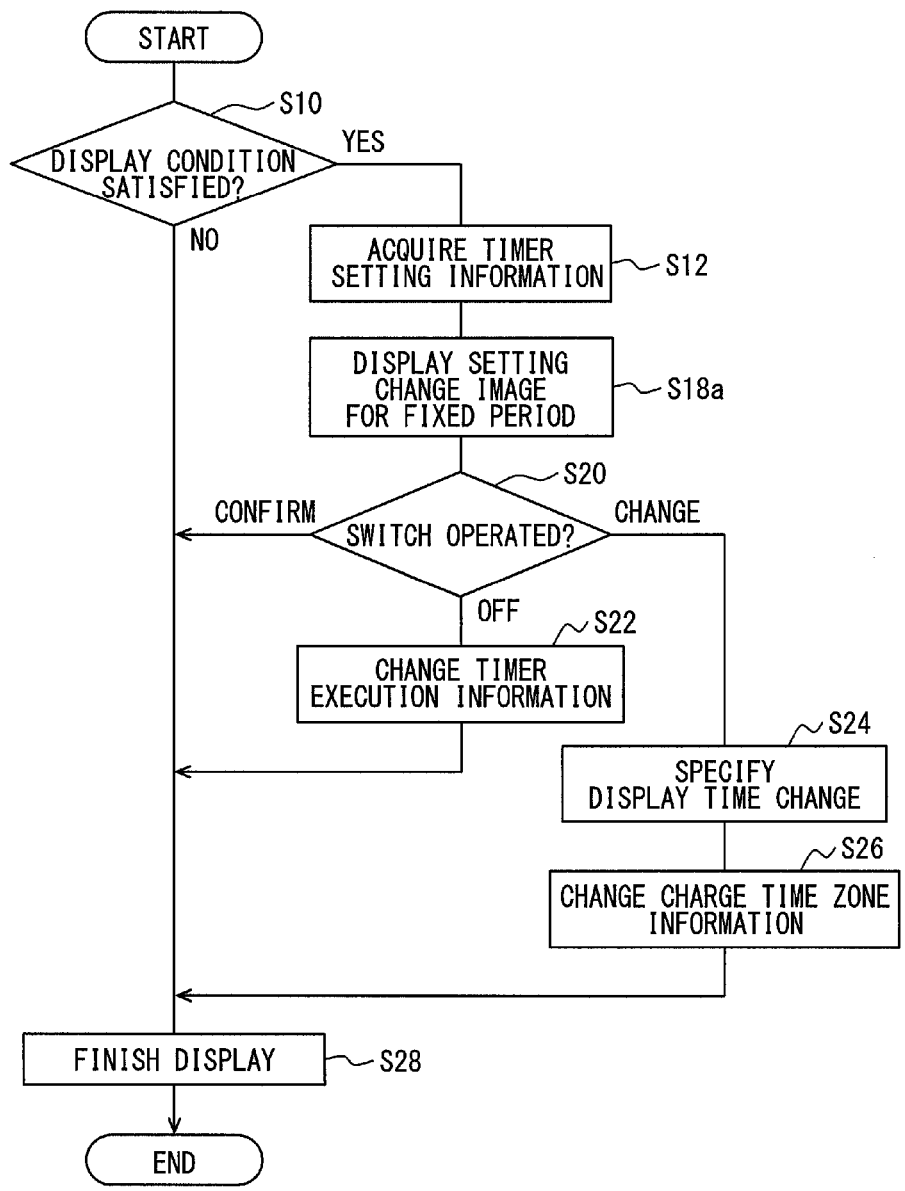
FIG. 5 is a flowchart of a timer reminder processing performed by a second embodiment.

In the present embodiment, the timer reminder processing executed by the timer reminder processing portion 24 of the in-vehicle device 2 is different. Therefore, the timer reminder processing (FIG. 5) will be described hereinafter.

The timer reminder processing of the present embodiment is executed when the accessory switch 12 is turned off. In the present embodiment, therefore, the power supply managing portion 40 of the power source managing ECU 4 is set so that the electric power supply from the battery 10 to the in-vehicle device 2 is kept until the timer reminder processing is finished.

In the timer reminder processing of the present embodiment, first, a process of determining whether a display condition is satisfied or not is executed at S10. The display condition is whether the accessory switch 12 is turned off or not in the state where the timer has been set.

When the display condition is not satisfied (S10: NO), a process of S28 is immediately executed to shut off the power supply from the battery 10 to the in-vehicle device 2 and to finish the display of the image on the display portion 20. Then, the timer reminder processing is finished. At S28, the power supply is shut off by providing the instruction of shut off the electric power supply to the in-vehicle 2 to the power supply managing portion 40.

When the display condition is satisfied (S10: YES), and when it is estimated that the user gets off the vehicle 1, a process of acquiring the charging time zone information from the timer managing portion 30 is executed (S12). Next, a process of S18a is executed.

At S18a, a process of displaying the setting change image 80 (see FIG. 4A) on the display of the display portion 20 for a fixed period is executed. Next, a process of S20 is executed.

In the present embodiment, when the fixed period elapses from the beginning of the display of the setting change image 80 on the display by the process of S18a, the process of S28 is immediately executed, irrespective of the processes on and after S20. Thus, the power supply from the battery 10 to the in-vehicle device 2 is shut off, and the display of the image on the display portion 20 is stopped.

At S20, a process of determining the switch operation is executed.

When the user operates the touch panel of the portion where the confirmation image 80b is displayed (S20: CONFIRM), the process of S28 is performed to shut off the electric power supply from the battery 10 to the in-vehicle device 2 to thereby finish the display of the image on the display portion 20. Thus, the timer reminder processing is finished.

Of the portion where the timer execution image 80c is displayed, when the touch panel of the portion where OFF is displayed at the center of the rectangle is operated (S20:OFF), a process of S22 is executed next.

At S22, the instruction to change the timer execution information to the information indicating that the timer setting is released to the timer managing portion 30 is executed. Thus, the timer execution information managed by the timer managing portion 30 is rewritten.

After S22 is finished, a process of S28 is executed to shut off the electric power supply from the battery 10 to the in-vehicle device 2 to thereby finish the display of the image on the display portion 20. Thus, the timer reminder processing is finished.

When the touch panel of the portion where the timer setting change image 80d is displayed is operated (S20: CHANGE), a process of S24 is executed next.

At S24, the charging time zone change image 81 as shown in FIG. 4B is displayed, and a process of changing the time (charging start time or the charging end time) displayed in the image 81 is displayed is executed.

When the charge start time and the charge end time are changed, and the user touches the touch panel on the screen where the setting finish image 81d is located, a process of S26 is executed next.

At S26, a process of transmitting the charging time zone information changed at S24 to the timer managing portion 30 is executed. Thus, the charging time zone information managed in the timer managing portion 30 is rewritten.

When S26 is finished, a process of S28 is executed to shut off the electric power supply from the battery 10 to the in-vehicle device 2 to thereby finish the display of the image by the display portion 20. The timer reminder processing is finished.

After S28 is executed, only when the accessory switch 12 is turned on again and the electric power is supplied from the battery 10 to the in-vehicle device 2, the timer reminder processing is executed.

In the present embodiment described above, the following advantageous effects will be achieved, in addition to the advantageous effects achieved by the first embodiment.

In the present embodiment, even when the accessory switch 12 of the vehicle 1 is turned off, the in-vehicle device 2 is supplied with the electric power for the fixed period, so that the timer setting information is displayed (S18a).

Therefore, even after the accessory switch 12 is turned off, the charging time zone information can be changed or the timer setting can be released. As such, the user does not need to turn on the accessory switch 12 to activate the in-vehicle device 2 again, and the user is not bothered.

At S18a, when the timer setting information is notified not only with the display of the setting change image 80 but also with a speech sound, the user can surely recognize the timer setting information.

In the present embodiment, the image is displayed immediately after the accessory switch 12 is turned off. In a setting where the transition of the screen is necessary (e.g., menu image→information setting image→charging setting image→setting change image 80), the operation is not necessary. In the present embodiment, since the operation to transit the image is not required, the convenience improves.

Third Embodiment

A third embodiment (hereinafter referred to as "the present embodiment" in the description of the third embodiment) will be described. In the present embodiment, only portions different from those of the second embodiment will be described. The processes and the structures same as those of the second embodiment will be designated with the same reference numbers.

In the present embodiment, the timer reminder processing executed by the in-vehicle device 2 is different. Also, the present embodiment is different because a timer reminder auxiliary processing is performed in the portable terminal 6. Hereinafter, the timer reminder processing (FIG. 6) and the timer reminder auxiliary processing (FIG. 7) will be described.

To discriminate the processing executed by the in-vehicle device 2 and the processing executed by the portable terminal 6, the processing executed by the in-vehicle device 2 is referred to as the timer reminder processing and the processing executed by the portable terminal 6 is referred to as the timer reminder auxiliary processing. However, the timer reminder processing and the timer reminder auxiliary processing are executed together.

Figure 6:
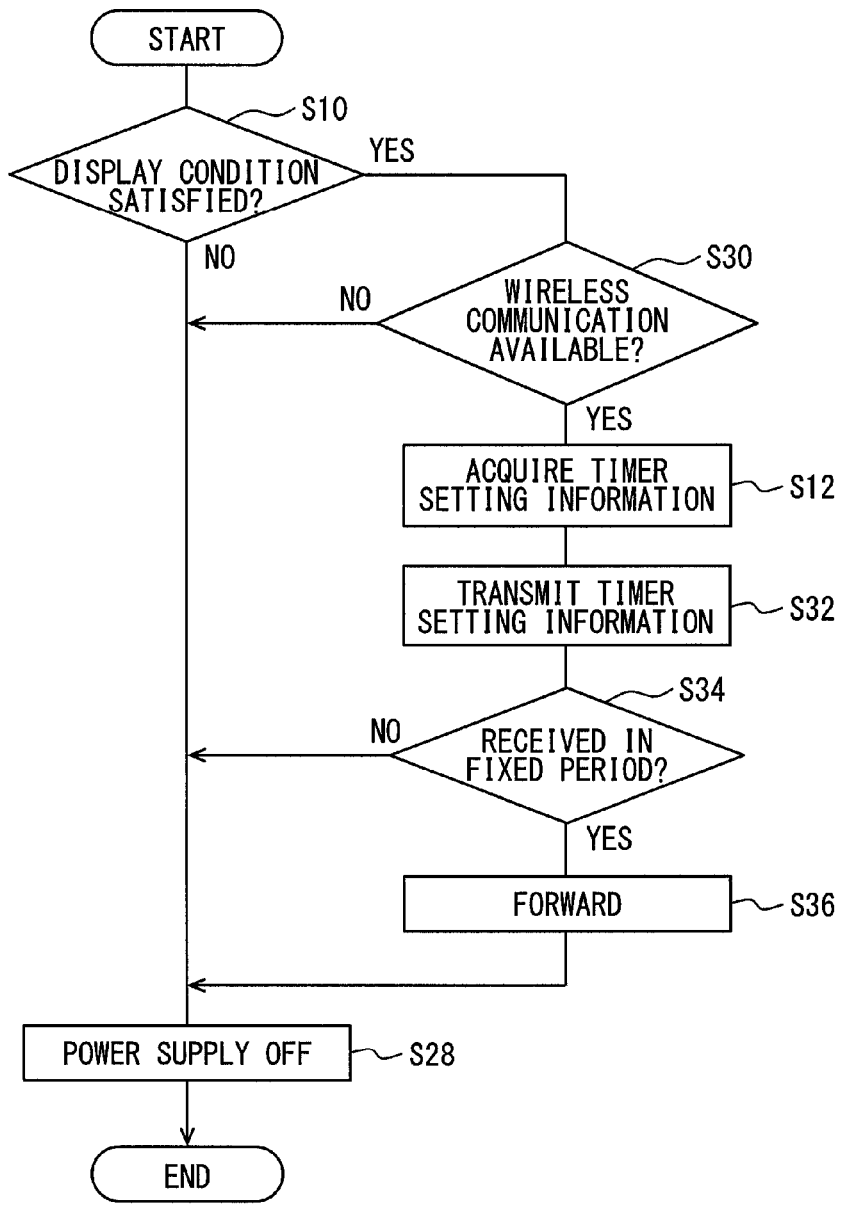
FIG. 6 is a flowchart of a timer reminder processing performed by a third embodiment.

In the timer reminder processing of the present embodiment, as shown in FIG. 6, the process of determining whether the display condition is satisfied or not is executed at S10.

When the display condition is not satisfied (S10: NO), the process of S28 is immediately executed to shut off the electric power supply from the battery 10 to the in-vehicle device 2. Thus, the timer reminder processing is finished.

When the display condition is satisfied (S10: YES), a process of determining whether a wireless communication with the portable terminal 6 is available or nor is executed by controlling the wireless communication control portion 26 (S30).

The wireless communication control portion 26 can communicate with the portable terminal 6 only when a distance between the portable terminal 6 and the in-vehicle device 2 is in a fixed distance.

Therefore, when the portable terminal 6 is not located in the fixed distance from the in-vehicle device 2, or when the portable terminal 6 is turned off and is not available to communicate, it is determined that the wireless communication is not available at S11. When it is determined that the wireless communication is not available at S11 (S30: NO), the process of S28 is immediately executed to shut off the electric power supply from the battery 10 to the in-vehicle device 2. Thus, the timer reminder processing is finished.

At S30, when it is determined that the wireless communication is available (S30: YES), the process of S12 is executed and then the processes of S32 and S34 are executed.

At S32, a process of transmitting the timer setting information acquired from the timer managing portion 30 at S12 to the portable terminal 6 is executed. At S32, the wireless communication is performed using the wireless communication control portion 26.

At S34, a process of determining whether a response to the transmission of the charging time zone information at S32 is made in a fixed period is executed.

When it is determined that the response was made in the fixed period (S34: YES), a process of S36 is executed next. When it is determined that the response was not made in the fixed period (S34: NO), the process of S28 is executed and the timer reminder processing is finished.

When the information received from the portable terminal 6 is confirmation information, which will be described later, at S36, the process of S28 is executed without executing a forwarding process. However, when the information received from the portable terminal 6 is the change instruction information for instructing the change of the timer setting information, which will be described later, the change instruction information is forwarded to the timer managing portion 30. In the timer managing portion 30, a process of changing the timer setting information is executed based on the change instruction information.

After the process of S36 is executed, the process of S28 is executed. Then, the timer reminder processing is finished.

Figure 7:
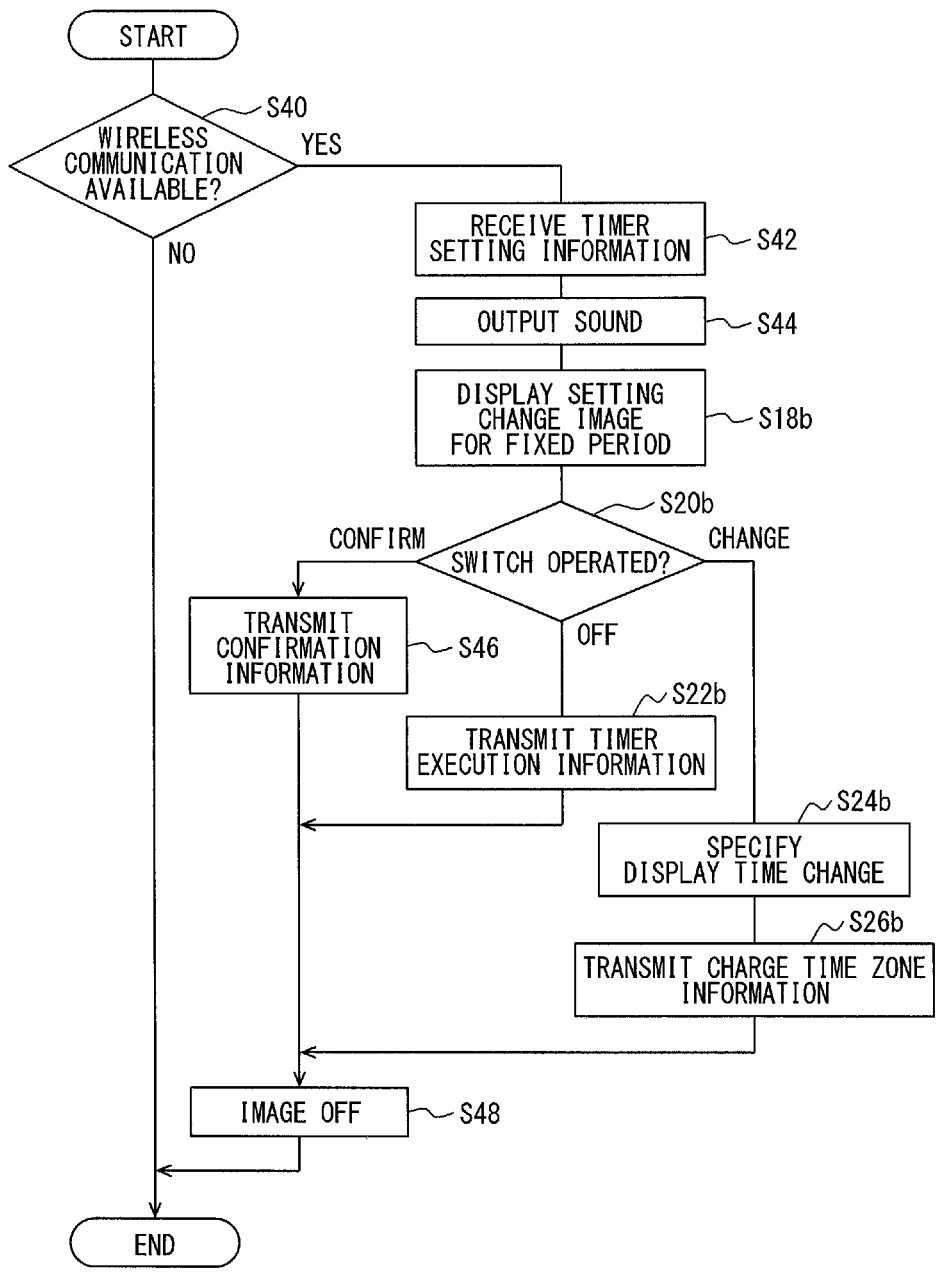
FIG. 7 is a flowchart of a timer reminder auxiliary processing performed by the third embodiment.

Next, the timer reminder auxiliary processing executed by the portable terminal 6 will be described with reference to FIG. 7.

When the timer reminder auxiliary processing is started, similarly to S30, a process of determining whether the wireless communication with the in-vehicle device 2 is available or not is executed by controlling the wireless communication control portion 61 (S40).

The wireless communication control portion 61 can communicate with the in-vehicle device 2 only when the distance between the portable terminal 6 and the in-vehicle device 2 is within the fixed distance.

Therefore, when it is determined that the communication is unavailable, such as when the in-vehicle device 2 is not within the fixed distance from the portable terminal 6 or when the in-vehicle device 2 is off and the communication is unavailable (S40: NO), the timer reminder auxiliary processing is immediately finished.

When the in-vehicle device 2 is located within the fixed distance from the portable terminal 6 and it is determined that the wireless communication is available (S40: YES), the processes of S42, S44 S18a and S20 are executed.

At S42, when the wireless communication of the in-vehicle device 2 and the portable terminal 6 is available, since the timer setting information is transmitted from the in-vehicle device 2, a process of receiving the timer setting information is executed through the wireless communication control portion 61.

At S44, a process of vibrating the portable terminal 6 using a vibrator of the change processing portion 63 or outputting a ringtone using a sound outputting device is executed.

At S18b, the process of displaying the setting change image 82 (see FIG. 8) on the display of the display portion 60 for a fixed period is executed. Next, the process of S20 is executed.

In the present embodiment, when the fixed period elapses after the display of the setting change image 82 on the display of the portable terminal 6 is started by the process of S18b, a process of S48 is immediately performed irrespective of the processes of S20 and after. Thus, the display of the setting change image 82 is stopped, and the timer setting auxiliary processing is finished.

Figure 8:
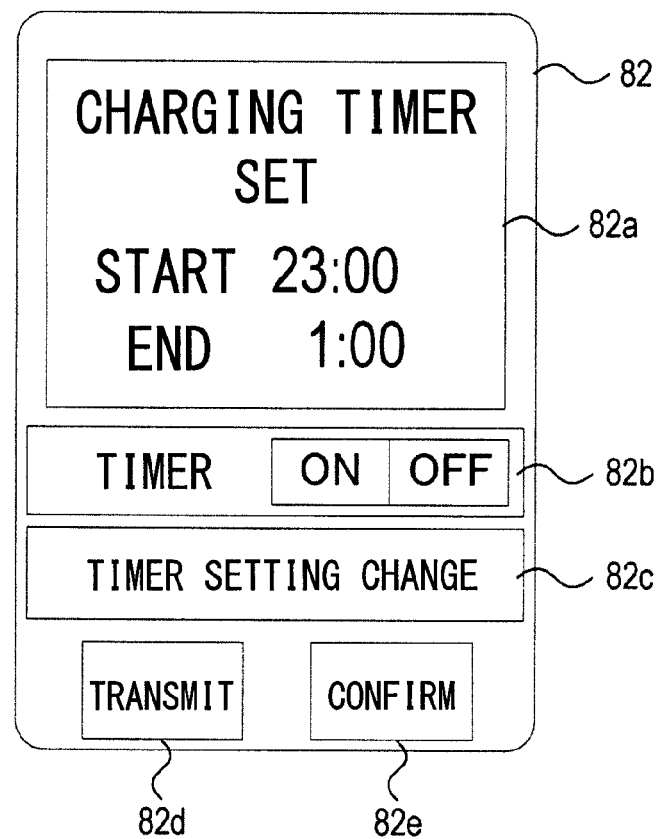
FIG. 8 is a diagram illustrating a setting change image displayed in a portable terminal.

As shown in FIG. 8, the setting change image 82 includes a charging time zone image 82a for indicating the charging time zone information at an upper half portion, a timer setting image 82b under the charging time zone image 82a, and a timer setting change image 82c under the timer setting image 82b.

The setting change image 82 further includes a transmission image 82d at a left lower portion of the timer setting change image 82c, and a confirmation image 82e at a right lower portion of the timer setting change image 82c.

The charging time zone image 82a includes display of "CHARGING TIMER SET" at an upper row, display of "START 23:00" at a middle row, and display of "END 1:00" at a lower row.

The timer setting image 82b includes display of "TIMER" on a left side, and displays of "ON" and "OFF" on a right side. The display of "OFF" is on the right of the display of "ON".

The timer setting change image 82c includes display of "TIMER SETTING CHANGE" at a center thereof.

The transmission image 82d includes display of "TRANSMIT" at a center thereof.

The confirmation image 82e includes display of "CONFIRM" at a center thereof.

In the portable terminal 6 of the present embodiment, when the operation receiving portion 62 is operated, any of images is selected and the instruction according to the image can be issued.

At S20b, a process of determining which instruction was issued using the setting change image 82 and the operation receiving portion 62 is executed.

When the operation of selecting the transmission image 82d is made after the operation or selecting the confirmation image 82e is made (S20b: CONFIRM), a process of S46 is executed as shown in FIG. 7.

At S46, a process of transmitting "confirmation information", which indicates that the timer setting information is confirmed using the wireless communication control portion 26, from the portable terminal 6 to the in-vehicle device 2 is executed. Thereafter, the process of S48 is executed, and the timer reminder auxiliary processing is finished.

When the timer setting image 82b is selected and the portion at the center of the rectangle where the OFF is displayed is selected (S20b: OFF), a process of S22b is executed next.

At S22b, the process of transmitting the instruction information to change the timer setting information, in particular, the instruction information to change the timer setting to off from the portable terminal 6 to the in-vehicle device 2 is executed. Then, the process of S48 is performed, and the timer reminder auxiliary processing is finished.

When the timer setting change image 82c is selected, a process of S24b is executed next.

When the process of S24b is executed, the operation to change the charging start time and the charging end time displayed on the charging time zone image 82a is available. When the user changes the respective time to an intended time for charging through the operation receiving portion 62, the information regarding the time changed is displayed as the charging time zone image 82a.

After the change of the charging start time and the charging end time is finished and when the timer setting change image 82c is selected again, a process of S26b is executed next.

At S26b, a process of transmitting the instruction information for changing the charging time zone information from the portable terminal 6 to the in-vehicle device 2 is executed. Then, the process of S48 is executed, and the timer reminder auxiliary processing is finished.

At S48, the process of changing the setting change image 82 displayed on the display portion 60 at S44 to another image is executed, and the timer reminder auxiliary processing is finished.

In the present embodiment described hereinabove, the following advantageous effects will be achieved in addition to the advantageous effects achieved by the second embodiment.

In the present embodiment, the timer setting information can be changed using the portable terminal 6.

In the present embodiment, therefore, even when the accessory switch 12 is turned off and the user is located at a fixed distance from the vehicle 1, the user can easily release the timer setting and change the charging time zone information.

When the portable terminal 6 receives the timer setting information, the receiving is notified using the vibrator or the sound outputting device (S44). Therefore, when the accessory switch 12 is turned off and the user connects the external power source 7 to the battery 10 at the position away from the vehicle 1 by the fixed distance while forgetting the timer having been set, the user is reminded and it is indicated whether the time the user connects the external power source 7 is in the time zone in which the charging is allowed.

Therefore, in use of the in-vehicle device 2 of the present embodiment, when the external power source 7 is connected to the battery 10 and the user is distant from the vehicle 1 by the fixed distance, the battery 10 can be charged according to the user's intention.

In the present embodiment, it is exemplified as a system in which the in-vehicle device 2 and the portable terminal 6 are connected through a near field wireless communication, such as Bluetooth (registered trademark) or Wi-Fi (registered trademark). As another example, it may be a high-function system having a device, such as DCM (Data Communication Module), that can communicate with an external server anytime and being supplied with the electric power from the battery 10 even when the accessory switch 12 is in an off state.

When such a high-function system is used, the timer setting information can be changed by communicating with the in-vehicle device 2 through the DCM.

When the DCM is used, there is no problem arise if the user is outside of the communicable area of Bluetooth (registered trademark) or Wi-Fi (registered trademark), or in the vehicle.

In an inexpensive system without having the DCM, the setting can be changed by accessing the in-vehicle device 2 from the portable terminal 6 only within the communicable area of Bluetooth (registered trademark) or Wi-Fi (registered trademark) or in the vehicle. Therefore, in such a system, an opportunity of changing the setting information can be limited, as compared with the high-function system having the DCM.

In the inexpensive system, the time period to display the timer setting information after the accessory switch 12 is turned off when the user gets off the vehicle may be set longer than that of the high-function system.

In the inexpensive system, therefore, the opportunity that the user can confirm the charging time zone information can be increased, and the user can operate through the in-vehicle device 2 as much as possible. Therefore, it can be reminded so that the setting can be made according to the user's intention.

When there is information to be transmitted to the portable terminal 6 from the in-vehicle device 2, in addition to the timer setting information, the timer setting information is transmitted preferentially.

This is because, when the information is transmitted from the in-vehicle device 2 to the portable terminal 6 through the near field wireless communication standard such as Bluetooth (registered trademark) or Wi-Fi (registered trademark) and the user is distant from the vehicle, there is a possibility that the communication is unavailable.

Other Embodiments

The timer reminder processing executed in each of the first to third embodiments is described separately as each embodiment. All of the timer reminder processings may be executed by a single in-vehicle device 2.

As the portable terminal 6, a mobile phone may be used. However, the portable terminal 6 is not limited to the mobile phone, but may be any device that can be portable and communicable with the in-vehicle device 2.

In the second and third embodiments, the display condition (S10) is indicated as the condition when the user gets off the vehicle 1. Alternatively, the display condition may be changed to the condition during the travelling or any other condition.

The portable terminal 6 may have a transparent touch panel laid on the liquid crystal display of the display portion 60, as the operation receiving portion 62.

In the second and third embodiments, the display condition is not limited to the timing where the accessory switch 12 is turned off, as long as whether the user is getting off the vehicle can be determined.

"Getting off the vehicle" may be any timing as long as it can be determined that the user is getting off the vehicle. The timing "getting off the vehicle" may be a timing before the user gest off the vehicle 1, a timing after the user gets off the vehicle 1, and a timing when the user is getting off the vehicle 1.

In particular, in addition to the timing the accessory switch 12 is turned off as described above, the condition of "getting off the vehicle" may be a timing when it is detected that the user separates from the seat by means of a seating sensor, a timing the door of the driver's seat is opened, a timing the door of the driver's seat is closed, a timing a fixed period has elapsed after the door was closed, or a timing the plug 70 is inserted to the external power source socket 11.

In the embodiments described above, for example, the process of S12 where the timer setting information is acquired from the timer managing portion 30 that controls the timer setting information set for charging the rechargeable battery of the vehicle corresponds to an acquiring portion. The process of S10 where it is determined whether display condition for displaying the timer setting information is satisfied corresponds to a determination portion. The processes of S14, S18, S18a, and S18b where the timer setting information acquired by the acquiring portion is displayed by the display portion 20, 60 when the determination portion determines that the display condition is satisfied correspond to a notification portion. The processes of S22, S22b, S24, S24b, S26 and S26b where the timer setting information is changed according to the operation received by the operation receiving portions 23 and 62 correspond to an information changing portion.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A timer reminder device for a vehicle that is driven by electric power stored in a rechargeable battery disposed in the vehicle, the rechargeable battery being configured to be charged by an external power source in a state where the rechargeable battery is connected to the external power source, the timer reminder device comprising:
    an acquiring portion that acquires a timer setting information from a managing portion disposed in the vehicle and managing a timer for automatically charging the rechargeable battery in a charging time zone set by a user, the timer setting information including a charging time zone information and a timer execution information, the charging time zone information being indicative of the charging time zone, the timer execution information being indicative of whether the timer is active in the charging time zone, the managing portion allowing the rechargeable battery to be automatically charged in the charging time zone when the timer is set and active in the charging time zone, and the managing portion disallowing the rechargeable battery to be charged in a time zone other than the charging time zone when the timer is set and active in the charging time zone;

a determination portion that determines whether a predetermined display condition for displaying the timer setting information is satisfied or not;

a notification portion that displays the charging time zone information and the timer execution information acquired by the acquiring portion on a display portion when the determination portion determines that the display condition is satisfied so as to remind the user that the timer is set and active in the charging time zone;

an operation receiving portion that receives a user's operation; and an information changing portion that changes the timer setting information according to the user's operation received by the operation receiving portion, wherein the predetermined display condition includes that a current time is outside of the charging time zone and the user is getting off the vehicle, and the notification portion displays the charging time zone information and the timer execution information on the display portion for a fixed period when the determination portion determines that the current time is outside of the charging time zone and the user is getting off the vehicle.

2. The timer reminder device according to claim 1, wherein the display portion is a display device provided in a portable terminal that is wirelessly communicable with the timer reminder device.

3. The timer reminder device according to claim 1, wherein
the information changing portion changes the charging time zone according to the user's operation received by the operation receiving portion.

4. The timer reminder device according to claim 1, wherein
the information changing portion releases the timer according to the user's operation received by the operation receiving portion.

5. A timer reminder device for a vehicle that is driven by an electric power stored in a rechargeable battery disposed in the vehicle, the rechargeable battery being configured to be charged by an external power source in a state where the rechargeable battery is connected to the external power source, the timer reminder device comprising:

an acquiring portion that acquires a timer setting information from a managing portion disposed in the vehicle and managing a timer for automatically charging the rechargeable battery in a charging time zone set by a user, the timer setting information including a charging time zone information and a timer execution information, the charging time zone information being indicative of the charging time zone the timer execution information being indicative of whether the timer is active in the charging time zone, the managing portion allowing the rechargeable battery to be automatically charged in the charging time zone when the timer is set and active in the charging time zone, and the managing portion disallowing the rechargeable battery to be charged in a time zone other than the charging time zone when the timer is set and active in the charging time zone;

a determination portion that determines whether a predetermined display condition for displaying the timer setting information is satisfied or not;

a notification portion that displays the charging time zone information and the timer execution information acquired by the acquiring portion on a display portion when the determination portion determines that the display condition is satisfied so as to remind the user that the timer is set and active in the charging time zone;

an operation receiving portion that receives a user's operation; and an information changing portion that changes the timer setting information according to the user's operation received by the operation receiving portion, wherein the display condition includes that a current time is out of the charging time zone and the current time is in one of states where a destination is set for a route guide processing, where a current position is a user's own house or is separated from another destination by a predetermined distance, and where the current position is separated from a charging station by a predetermined distance, and the notification portion displays the charging time zone information and the timer execution information on the display portion when the determination portion determines that the current time is out of the charging time zone and the current time is in one of the states.

6. The timer reminder device according to claim 5, wherein
the display condition includes whether the user is travelling on the vehicle at the current time, and
the notification portion displays the charging time zone information and the timer execution information on the display portion when the determination portion determines that the user is travelling.

7. The timer reminder device according to claim 5, wherein
the information changing portion changes the charging time zone according to the user's operation received by the operation receiving portion.

8. The timer reminder device according to claim 5, wherein
the information changing portion releases the timer according to the user's operation received by the operation receiving portion.

9. A system comprising:

an electric vehicle driven by electric power stored in a rechargeable battery disposed in the electric vehicle, the rechargeable battery being configured for charging by an external power source when the rechargeable battery is connected to the external power source, the electric vehicle having an in-vehicle device, a charge managing control unit, a battery control unit, and a seating sensor; and a portable terminal operated by a user of the electric vehicle, the portable terminal being in wireless communication with the in-vehicle device of the electric vehicle;

wherein:

the battery control unit is configured to control charging of the rechargeable battery when the electric vehicle is connected to the external power source based on instructions received from the charge managing control unit;

the charge managing control unit is configured to store timer execution information that includes information indicating whether a timer for automatically charging the rechargeable battery is in a set state or a released state and, when the timer is in the set state, a charging time zone including a charging start time and a charging end time;

the charge managing control is further configured to instruct the battery control unit to permit charging of the rechargeable battery when (i) the electric vehicle is connected to the external power source and the timer is in the released state or (ii) the electric vehicle is connected to the external power source, the timer is in the set state, and a current time is between the charging start time and the charging end time;

the charge managing control unit is further configured to instruct the battery control unit to prohibit charging of the rechargeable battery when the timer has been set and the current time is not between the charging start time and the charging end time;

the in-vehicle device is configured to determine whether a predetermined display condition is met, the predetermined display condition including that the timer is set, the current time is not between the charging start time and the charging end time, and the seating sensor indicates that the user is separated from a seat of the electric vehicle;

the in-vehicle device is further configured to, in response to determining that the predetermined display condition is met, wirelessly communicate the timer execution information to the portable terminal;

the portable terminal is configured to, in response to receiving the timer execution information to the portable terminal, output a display indicating whether the timer is in the set state and, when the timer is in the set state, the charging start time and the charging end time;

the portable terminal is further configured to prompt the user to confirm the timer execution information or to modify the timer execution information by changing the timer from the set state to the released state when the timer is in the set state, by changing the timer from the released state to the set state when the timer is in the released state, by changing the charging start time when the timer is in the set state, or by changing the charging end time when the timer is in the set state;

the portable terminal is further configured to, in response to the user modifying the timer execution information, communicate the modified timer execution information to the in-vehicle device;

the in-vehicle device is configured to, in response to receiving the modified timer execution information from the portable terminal, communicate the modified timer execution information to the charge managing control unit; and the charge managing control unit is further configured to, in response to receiving the modified timer execution information from the in-vehicle device, update the previously stored timer execution information based on the modified timer execution information received from the in-vehicle device.

* * * * *